Nov. 23, 1954   R. B. BARTON   2,695,236
METHOD AND MEANS FOR MAKING AND
DISPENSING EFFERVESCENT LIQUIDS
Filed Sept. 15, 1950
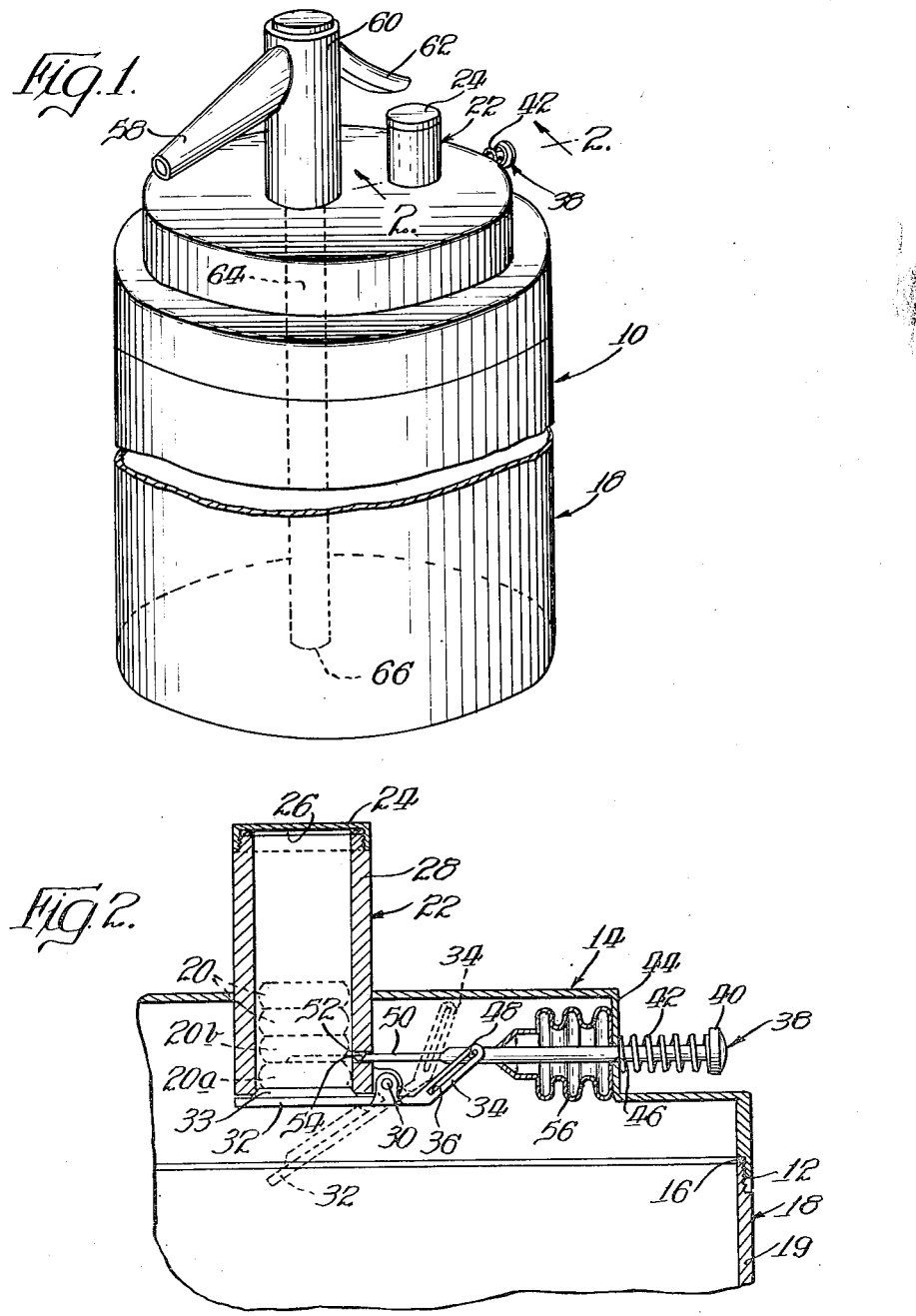
INVENTOR.
Robert B. Barton
BY
Attys:

United States Patent Office 2,695,236
Patented Nov. 23, 1954

2,695,236

METHOD AND MEANS FOR MAKING AND DISPENSING EFFERVESCENT LIQUIDS

Robert B. Barton, Chicago, Ill.

Application September 15, 1950, Serial No. 184,953

8 Claims. (Cl. 99—78)

My invention pertains generally to a method and means for making and dispensing effervescent liquids and, more particularly, to a method and means for both making and retaining the liquid effervescent in a closed, pressure-tight container.

It is an object of my invention to provide a method and means for making a liquid effervescent and retaining it in a pressure-tight container awaiting the time when it is desired to dispense the same from the container.

It is another object of my invention to provide a method and means for making a liquid effervescent by use of an effervescent couple in dry, thoroughly intermixed form, with the couple and other dry ingredients, and also the liquid, being disposed in the same vessel or container but being maintained out of contact with each other until such time as it is desired to make the liquid effervescent.

It is a further object to provide a pressure-tight container in which the effervescent liquid may not only be made but also may be retained without loss of its "sparkle" and into which additional amounts of dry ingredients may be discharged from time to time without need of opening the container.

It is another object of my invention to provide means which is operable from the exterior of the pressure-tight container for discharging selected quantities of the dry material into the liquid.

It is still another object to provide a container structure wherein the dry components are maintained out of the atmosphere of the liquid until such time as it is desired to contact the dry material with the liquid and thereafter to protect the uncontacted dry material from the effervescent liquid.

It is a further object of my invention to provide a convenient means and method for making a "carbonated" beverage, at home, with the user being able to purchase his own ingredients, such as sweetening, coloring matter, and flavoring and an effervescent couple, and being able to mix them in proportions and quantities to suit his own tastes. The sweetening, coloring and flavoring may be combined as a syrup which requires only a dilution with water and the addition of the means for adding carbonation. For example, syrup which contains flavoring, sweetening and artificial coloring may be placed with water in the container of my invention, and the effervescent couple, preferably in the form of tablets, may also be disposed in the container but out of contact with the liquid. Means is then provided for sequentially contacting the tablets with the liquid to form the carbonated beverage. The contacting of the dry effervescent couple with the liquid results in the formation of carbon dioxide gas which affords the "carbonation" or "sparkle" to the beverage. Pressure, from the presence of the carbon dioxide gas which is formed, develops within the container and is maintained since the container is pressure-tight. Consequently, the carbon dioxide, to considerable extent, is retained in the liquid and the beverage does not go "flat." A spout and a valve therefore permits the discharge of the carbonated beverage at any desired time for drinking purposes.

It will be understood that in the practice of my invention in making carbonated beverages it is also contemplated that the dry tablet may contain, in addition to the effervescent couple, flavoring, sweetening and coloring so that only water needs to be placed in the container. Or the tablets which contain the effervescent couple in dry form may additionally contain only coloring matter, or only flavoring or only sweetening, or combinations of the foregoing. It will be apparent that the flavoring may be supplied by ingredients going to make up the effervescent couple, or by an excess quantity of one or more of the components of the couple over that required for the coupling action. Any of the ingredients not provided with the dry effervescent couple are then placed with the water in the container.

By providing means for sequentially discharging the tablets, the user is enabled to select the amount of "carbonation" desired for the particular quantity of liquid in the container. Also, if there is any leakage of gas from the container as, for example, by accidental loosening of the cover, the user may add further quantities of effervescent couple to the liquid to strengthen the effervescence or "carbonation." It will be understood that in referring to "effervescence" here and in the claims, that term is intended to embrace the word "carbonation," as the latter is commonly used in referring to liquids which bubble.

It will also be understood that in making such carbonated beverage the method also contemplates the steps of placing the liquid portion in the container and then adding the dry tablet or powder, or placing the dry material in the container and then adding the liquid portion, followed—in either case—by immediately thereafter capping the container in a pressure-tight manner so that the production of gas will substantially all occur in a pressure-tight container.

Further objects, uses, and advantages of my invention will become apparent, or be obvious, from a consideration of the following description, when taken with the drawings, in which:

Figure 1 is a perspective, fragmentary view of the container of my invention; and Figure 2 is an enlarged fragmentary, sectional view on the line 2—2 of Figure 1.

Referring first to Figure 1, there will be seen a container, indicated generally by the reference numeral 10, which is threaded at its upper end, as at 12 (see Figure 2), to receive an internally threaded cover, or closure element, indicated generally by the reference numeral 14. A gasket 16 may be carried by the cover in order to ensure a pressure-tight seal between the cover 14 and the lower portion 18 of the container 10. The lower portion 18 is defined by wall means 19 and is adapted to hold liquid such as water or a mixture of water and syrup.

A chamber for holding a dry effervescent couple, preferably in the form of tablets 20, is indicated generally by the reference numeral 22. Chamber 22 has a threaded cover 24 carrying a gasket 26 so that the cover may be threaded onto the chamber 22 in pressure-tight relationship. By removal of the cover 24, a plurality of tablets 20 may be inserted into the chamber 22 and the cover can then be threaded back on. Chamber 22 is defined by the wall means 28, cover 24 and opens downwardly toward the liquid containing chamber 18. Chamber 22 is carried by the cover 14 of the container 10 and pivotally supports at its lower end a closure element 32 which closes off from each other the liquid holding and effervescent couple holding chambers 18 and 22. A gasket 33 may be carried by the closure element 32 to ensure a pressure-tight seal, with the lower edge of wall 28 of chamber 22. On the other side of the pivotal connection 30 the closure element 32 has an arm 34 having an elongated slot 36.

An operating handle, indicated generally by the reference numeral 38, has an enlarged end 40 extending to the exterior of the cover 14 and of chambers 18 and 22, with a spring 42 being interposed between the headed end 40 of the handle and a wall portion 44 of the cover 14. Handle 38 extends through an opening 46 in the wall 44 of the cover 14 and, by means of a pin 48, carried by the handle 38, it has a connection with the slotted arm 34 of the closure element 32, said pin being adapted to move in the slot 36.

Also connected to the handle 38 at its inner end is a slide or metering element 50, the forward end of which is beveled, as at 52, so that when the slide moves to the left, as viewed in Figure 2, through a close-fitting aperture 54 in the wall means 28 of chamber 22, the beveled edge may pass between the adjacent surfaces of the lowermost tablet 20a and the next to the lowermost tablet 20b so that all of the tablets above the lowermost tablet 20a will be retained in chamber 22 when the closure element 32 between the chambers 22 and 18 is moved simultaneously by handle 38 to the dotted line position indicated in Figure 2. It will be readily seen, therefore, that when handle 38 is moved to the left against the action of the spring 42, it acts to insert the slide 50 between the two lowermost tablets, while, at the same time, pivotally moving the closure element 32 downwardly to permit discharge of the lowermost tablet into the liquid in the liquid containing chamber 18. When the handle 38 is released, the spring 42 quickly moves it to the right, thereby moving the closure element 32 to a pressure-tight position over the lower end of chamber 22, while simultaneously withdrawing the slide 50. At that time, the tablets which were supported above the slide 50 descend until the lowermost tablet rests against the top surface of the closure element 32.

In order to ensure that pressure within container 10 will not be lost through the opening 46 in the wall 44 of cover 14, there is employed a resilient, expansible sealing element 56 which is secured about the handle 38, inwardly of cover 14, and is interposed between said handle and the wall portion 44 of said cover about the opening 46. It will be readily apparent that a similar expansible sealing element may be employed between the slide 50 and wall means 28 of chamber 22 about the opening 54 in said wall means 28, if desired. Alternatively, a close-fitting gasket may be employed in aperture 54 through which gasket the slide 50 may travel.

Referring now to Figure 1, it will be seen that cap or cover 14 also supports a discharge spout 58 which communicates, through a valve of the usual type (not shown) disposed in the valve housing 60 and movable from its seat (not shown) in a known manner by a spring loaded handle 62, with a tube 64 and thereby with the bottom of the container 10, the lower end 66 of tube 64 being disposed slightly above the bottom inner surface of said container. Pressure within the container 10 exerts a force on the top surface of the liquid within the container and forces the liquid up the tube 64 and, when the valve of the discharge spout is open, then forces the liquid out of the spout 58. If it were desired merely to pour the liquid from the container 10, tube 64 might then be dispensed with and spout 58, instead of being carried by the cover 14, would, preferably, be carried in the side wall 19 of the liquid holding chamber 18 so that, during the pouring operation, liquid would not tend to rise and surround the chamber 22.

Within the foregoing container one of the processes of my invention may be conveniently carried out, said process comprising, broadly, the disposition of liquid which is to be made effervescent, together with an effervescent couple, within a container which is then made pressure-tight, as by securing the cover onto the container with the effervescent couple and the liquid being maintained out of contact with each other and then selectively contacting portions or all of the couple with the liquid in order to make it effervescent. In this manner an effervescent liquid is both completely made and also retained in a pressure-tight container. Preferably, the effervescent couple is in a dry, thoroughly intermixed and tableted form, with each of the tablets having the same quantity of effervescent couple. However, the couple in loose powdered form could be used. The liquid may be plain water or distilled water, for example, and the effervescent couple may comprise an edible acid and a carbonate or bicarbonate, such, for example, as citric acid or tartaric acid and sodium carbonate, or, preferably, sodium bicarbonate.

It will be readily understood that the foregoing container also lends itself to the broader process of forming a carbonated liquid or beverage under pressure by removal of the cover 14 and the disposition one after the other, or together, of the liquid and dry components, followed by threading the cover 14 onto the lower portion 18 of the container 10 so that gas which is produced will be generated in, and be maintained in, a pressure-tight container, whence it may be dispensed, as desired, through spout 58 by manipulation of the handle 62 of the discharge valve.

In the process of making a "carbonated" beverage, the process is carried out by disposing in the liquid containing chamber 18 of container 10 the desired quantity of water with syrup mixed into it. In the preferred practice, the syrup contains the flavoring and sweetening, together with any artificial coloring which may be desired and the effervescent couple is in dry tableted form. However, it is possible to have either the flavoring, sweetening or coloring, or any one or combination of them, either partially or entirely included within the tablets, together with the effervescent couple. The tablets may be introduced into the pressure-tight container 10 by disposing them in chamber 22 which is carried by the cover 14. To that end, the cover or cap 24 for chamber 22 is unscrewed and the tablets are introduced and the cover is then screwed back in place. Spring 42, which is disposed about the operating handle 38, is sufficiently strong that the weight of the tablets 20 is insufficient to cause the closure element to be moved downwardly about its pivot point 30 as the tablets are introduced and left in chamber 22. It will be appreciated that chamber 22 might be carried, not by the cover member 14, but, instead, by the liquid containing chamber 18 at some location adjacent the top part thereof and the necessary operating mechanism for discharging the tablets from chamber 22 into chamber 18 would then also be associated with the liquid holding chamber 18.

After the syrup and water mixture has been introduced into the liquid holding chamber 18 and the cover 14 has been threaded onto it to produce a pressure-tight seal, the user may then discharge one of the tablets containing the effervescent couple into the liquid by pressing the operating handle 38 to the left which, as described above, causes the slide 50 to insert itself between the lowermost tablet 20a and the next to the lowermost tablet 20b so that all of the tablets above the lowermost tablet 20a are supported in the chamber 22 while the pivoted closure member 32 rotates in a counterclockwise direction, by reason of its slot and pin connection with handle 38, to an open position permitting the tablet 20a to drop down into the liquid. The tablet will dissolve in the liquid and will produce carbon dioxide gas which supplies the effervescence to the liquid. The pressure within container 10 builds up as a result of this gas production, but the gas does not escape due to the fact that the cover 14 is sealed in pressure-tight relationship to the liquid containing chamber 18 and because the opening 46 through the side wall 44 of cover 14 is sealed off from the interior of the container 10 by the flexible seal 56. The user may discharge a second or third, or still other, tablet in immediate succession, if desired, depending upon the degree of effervescence desired. On the other hand, the user may prefer to discharge another tablet into the liquid at a later date to assure that any loss of effervescence is compensated for, in case the liquid remains in the chamber for an extended period of time. While there should be no loss of gas (and therefore no loss of effervescence) because the container is pressure-tight, it is possible that in usage the cover 14 of the container may be accidentally loosened a slight amount, and thereby permit a slow discharge of the gas and loss of effervescence, with the result that some of the effervescence is lost. This can be corrected by the addition of additional tablets in an amount depending upon the amount of liquid in the container and the amount of effervescence desired.

As soon as the handle 38 is manipulated to discharge a tablet, it is released and the spring 42 thereupon simultaneously withdraws the metering slide 50 and returns the closure element 32 to its position between chamber 22 and chamber 18 to close them off from each other. The effervescent beverage in the container 10 may then be discharged in desired quantities by manipulation of the valve handle 62 so that the beverage will be discharged through the discharge spout 58. During such time as the effervescent liquid stays in the container the undischarged tablets 20 are maintained out of contact with the liquid and are maintained in an atmosphere different from that above the effervescent liquid by reason of their being in chamber 22.

If the user is not interested in the selectivity of the above recited process, he may prefer to place the syrup and water in the container 18 and then drop a tablet, or powder, containing the effervescent couple into the liquid and then immediately thread the cover onto the container in pressure-tight relationship. Even then, it is possible thereafter to add additional tablets by appropriate manipulation of the handle 38. In practicing the process as just described, the tablet may first be placed in the container 18 followed by introduction of the liquid and then the capping operation, or the tablet and liquid can be placed in container 18 simultaneously.

While I have described preferred embodiments of my invention, I do not intend to be limited thereto, except insofar as the following claims are so limited, since various modifications and changes coming within the scope of the invention will be suggested to others by reason of my disclosure.

I claim:

1. A container in which a liquid is adapted to be made effervescent and maintained under pressure comprising, in combination, wall means defining a chamber adapted to hold liquid, wall means defining a chamber for holding an effervescent couple in dry, intermixed and tableted form, a removable cover adapted to be secured to the liquid holding chamber to close off both chambers from atmosphere to render them pressure tight, said chamber for holding tablets being carried by said cover member and being adapted to discharge in a downward direction toward the liquid holding chamber, a removable pressure tight cover for the upper end of the tablet holding chamber for admission of tablets, a pressure tight movable closure member disposed between the two chambers and pivotally supported adjacent the lower end of the tablet holding chamber, an arm on said closure member, an operating handle connected with said arm for moving the closure element to permit the discharge of a tablet from the tablet holding chamber, said handle being biased in a direction to normally cause closing of the closure member between the chambers and said handle being supported by the cover for the liquid holding chamber and having an end operable from exterior of said chambers, flexible sealing means interposed between the handle and the first mentioned cover to prevent escape of pressure during manipulation of the handle, a metering slide which is connected with the handle and passes through an opening in the side of the tablet holding chamber, said slide being reciprocated by movement of said handle, said slide entering between the lowermost tablet and any tablets immediately above the lowermost tablet to retain the latter in the tablet holding chamber as the handle is operated to cause movement of the closure member to permit discharge of the lowermost tablet into the liquid, a discharge spout carried by the cover for the liquid holding chamber and communicating with the latter chamber for discharging liquid from it, and valve means for controlling the flow of liquid from said spout.

2. The process of making an effervescent liquid and retaining it under pressure which comprises disposing the liquid and a dry effervescent couple in a pressure-tight container with the couple being protected from the liquid by being maintained in an atmosphere separate from that in which the liquid is maintained prior to the time when the effervescent couple is contacted with the liquid, said couple being intimately intermixed and compacted into units of predetermined mass, and then contacting the couple and liquid within said pressure-tight container by discharging units sequentially into said liquid, while continuing to protect the undischarged units from said liquid.

3. The process of claim 2 wherein flavoring is included in each unit which is discharged into the liquid, with said flavoring comprising an excess acidic component of the effervescent couple.

4. A container in which a liquid is adapted to be made effervescent and maintained under pressure comprising, in combination, wall means defining a chamber adapted to hold liquid, wall means defining a chamber for holding an effervescent couple in dry intermixed and tableted form, closure means normally biased to closed position and adapted to separate said chambers and to maintain the tablets in an atmosphere separate from that in which the liquid is maintained, a removable closure member for the liquid holding chamber for closing off both chambers from exterior atmosphere to render them pressure-tight, operating mechanism operable from the exterior of the pressure-tight chambers for opening said closure means for discharging a tablet into said liquid, a discharge spout for discharging liquid from the liquid holding chamber and valve means for controlling the flow of liquid from said spout.

5. The container of claim 4 wherein said chamber for holding tablets is permanently fixed to the removable closure member for the liquid holding chamber.

6. The container of claim 4 wherein the tablet holding chamber has a removable pressure-tight cover located at the exterior of said container for the admission of tablets.

7. The container of claim 4 wherein said operating mechanism comprises a handle exterior of said container, movable longitudinally of its own axis for operating the closure means between said chambers, and having associated with it interiorly of said container a metering structure for retaining in the tablet holding chamber all tablets except one when the handle is manipulated to permit the discharge of a tablet into the liquid.

8. The combination of claim 4 wherein the operating mechanism comprises a handle exterior of said container for operating the closure means between said chambers, and wherein there is flexible sealing means interposed between the handle and the container to prevent escape of pressure from the container around said handle during manipulation of the handle or at other times.

References Cited in the file of this patent

UNITED STATES PATENTS

| Number | Name | Date |
|---|---|---|
| 1,021,087 | Bienz | Mar. 26, 1912 |
| 1,159,968 | Long et al. | Nov. 9, 1915 |
| 1,974,332 | Hauck | Sept. 18, 1934 |
| 2,105,690 | Greenblatt | Jan. 18, 1938 |
| 2,205,147 | Madsen | June 18, 1940 |
| 2,220,146 | Curry | Nov. 5, 1940 |
| 2,255,450 | Mutchler | Sept. 9, 1941 |